United States Patent
Balle-Pedersen et al.

(10) Patent No.: US 10,554,925 B2
(45) Date of Patent: Feb. 4, 2020

(54) DIGITAL CAMERA RAW IMAGE SUPPORT

(71) Applicant: Apple Inc., Cupertino, CA (US)

(72) Inventors: Michael Balle-Pedersen, Campbell, CA (US); David Hayward, Los Altos, CA (US); Travis W. Brown, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/195,345

(22) Filed: Nov. 19, 2018

(65) Prior Publication Data

US 2019/0089926 A1 Mar. 21, 2019

Related U.S. Application Data

(63) Continuation of application No. 13/364,669, filed on Feb. 2, 2012, now Pat. No. 10,136,097.

(51) Int. Cl.
*H04N 5/228* (2006.01)
*H04N 5/77* (2006.01)

(52) U.S. Cl.
CPC ................... *H04N 5/77* (2013.01)

(58) Field of Classification Search
CPC ........... H04N 5/23206; H04N 5/23229; H04N 5/357; H04N 5/2173; G06T 5/00; G06T 2200/28
See application file for complete search history.

(56) References Cited

U.S. PATENT DOCUMENTS

| 10,136,097 B2 * | 11/2018 | Balle-Pedersen ........ H04N 5/77 |
| 2004/0212692 A1 | 10/2004 | Nakami |
| 2005/0196040 A1 | 9/2005 | Ohara |
| 2006/0001746 A1 | 1/2006 | Watanabe |
| 2006/0268357 A1 | 11/2006 | Vook |
| 2008/0088858 A1 | 4/2008 | Marcu |
| 2008/0106604 A1 | 5/2008 | Kojima |
| 2008/0170136 A1* | 7/2008 | Raynor ............... H04N 5/357 348/241 |
| 2010/0226594 A1 | 9/2010 | Mikawa |
| 2011/0298933 A1* | 12/2011 | Yanowitz ............ H04N 5/367 348/175 |

* cited by examiner

*Primary Examiner* — Kelly L Jerabek
(74) *Attorney, Agent, or Firm* — Blank Rome LLP

(57) ABSTRACT

RAW camera images may be processed by a computer system using either a particular application or a system level service. In either case, at least some parameters needed for the processing are preferably separated from the executable binary of the application or service, and are provided in separate, non-executable, data-only files. Each of these files can correspond to a particular camera or other imaging device. When a user of the system attempts to open a RAW image file from an unsupported device, the local system may contact a server for on-demand download and on-the-fly installation of the required support resource.

20 Claims, 3 Drawing Sheets

DIGITAL CAMERA RAW IMAGE SUPPORT

FIELD OF THE DISCLOSURE

The subject matter of the present disclosure generally relates to processing RAW images in a computer system. More specifically, the present disclosure relates so techniques for providing updates to camera-specific information required by the computer system to process the RAW images.

BACKGROUND

Digital cameras are often capable of providing image data in multiple formats. Many digital cameras provide the option to download the unmodified linear sensor data, in what is known as a RAW image file. Virtually all digital cameras provide compressed images in JPEG or some other format, which are created by the camera from these RAW image files. For many users, accessing and processing this RAW image file is preferable to the JPEG output of the camera, as it gives the user enhanced control and choices for optimizing the image that may be different from those selected by the camera manufacturer in designing the processing by which the camera creates the JPEG or other image. A variety of software exists for processing these RAW images, including Aperture® and iPhoto®, which are both available for the Apple's Mac platform. (APERTURE and IPHOT are registered trademarks of Apple Inc.)

However, the format of this RAW image file varies. For example, the type of colored filter array and digital imaging sensor varies from camera to camera, which affects how the RAW data appears. Additionally, digital cameras employ a variety of other imaging parameters, such as white balance settings or sensitivity, which are required to properly process the image. Most camera manufacturers use a format for these RAW images that is proprietary to that manufacturer. In some cases, manufacturers may even use different formats for different cameras or ranges of cameras. Even though these formats vary, in many cases the image format is based on the TIFF/EP format, with vendor specific meta data stored in an EXIF Makernote.

The nature of RAW image processing is such that some of the information needed to process the RAW images is built into the processing pipeline, and is thus part of an executable, binary file. In many cases, the information is built into the image processing software itself. In other cases, such as Apple's OS X operating system, an operating system service (known as RawCamera) provides support for opening digital camera RAW images. Various clients use this service, including the aforementioned iPhoto and Aperture software as well as third party clients. In the case of Apple's system, when a digital camera raw image is opened, the image is first parsed by a vendor specific image parser. The parser extracts information from the file that is used to identify the camera model. Depending on the vendor, the camera is identified using either a model name, or a unique numerical camera model identifier. With the camera model identified, essential information required to correctly processes the image can now be determined, information like sensor geometry, white and black level, exposure compensation, noise and color characterization as well as image data codec. With this information in place, the actual image data can be unpacked and processed into an output referred image.

The information required to handle processing of a concrete camera model is divided into a property list file and actual code. The property list file contains simple settings that control the processing of the file, such as color matrices and exposure compensation, whereas the code contains information requiring complex logic to determine the right setting. For example, camera manufactures add features such as high dynamic range imaging ("HDR") that require adjustments to the various brightness and color compensation curves in the camera. Often these changes must be included in the code rather than as separate parameters.

When manufacturers release new digital cameras that provide RAW image support, updates are required to such software to enable it to process the RAW images from the new camera. In some cases this is an update to the application binary, in others, such as Apple's OS X it takes the form of an operating system update. In either case, adding support for a new camera is a multi stage process, that among other, include reverse engineering the proprietary file format, determining basic image properties like, white balance, black level, ISO, crop, metadata as well as noise and color characterization. Because of the cost and complexity of providing updates to application and/or system binaries, software vendors typically provide such updates on relatively long time frames (e.g., every two to three months) and provide updates to add support for multiple cameras (e.g., five to ten). While this reduces the number of updates, it is disadvantageous for users of the new cameras, who find that their new cameras remain unsupported until the next update. Additionally, updating application and/or system binaries is disruptive to the user's workflow. Thus, it would be desirable to provide an improved technique for providing updates to allow application software on a computer to process RAW images from a digital camera.

SUMMARY

Various systems and techniques for facilitating the updating of computer systems used for the processing of RAW images from a digital camera are disclosed herein. Rather than providing information needed for the decoding and processing these RAW images in the binary of a program doing the processing, the information is bifurcated between the program binary and one or more non-executable, data-only resources. These non-executable, data-only resources can include many of the parameters needed to support RAW images from a variety of camera types, which simplifies the addition of support for new camera types or the modification of support for existing camera types. These resources may be used by either an application-level RAW image processing system or by a system-level service.

Additionally, these non-executable, data-only resources may be downloaded from an online resource on-demand and installed on-the-fly when needed for processing a particular image. Alternatively, they may be downloaded and installed at regular intervals, determined either by time or specific events. In either case, user notifications may be provided or may be suppressed depending on the user experience that is desired by the system designer. The online resource may be a server connected to the processing device by a network link, or the online resource may be from another device, such as the camera itself.

BRIEF DESCRIPTION OF THE DRAWINGS

Preferred embodiments and other aspects of subject matter of the present disclosure will be best understood with reference to a detailed description, which follows, when read in conjunction with the accompanying drawings, in which:

FIG. 4 illustrates an exemplary data resource for use as a camera plug-in.

Figure 1:
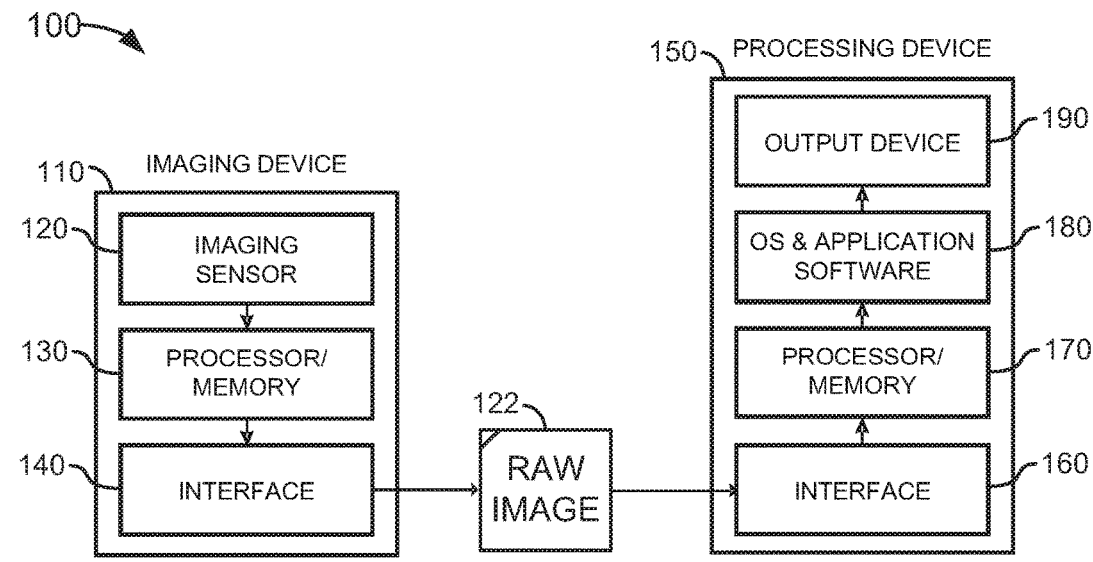
FIG. 1 illustrates one embodiment of a system for generating and processing RAW images.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 1, one embodiment of a system 100 for generating and processing RAW images is schematically illustrated. The system 100 includes an imaging device 110 and a general-purpose processing device 150. In general, the imaging device 110 and the general-purpose processing device 150 may integrated together into one device, such as a digital still camera or the like, that has requisite processing and memory capabilities. Alternatively, the devices 110 and 150 may be separate components as shown in FIG. 1. For example, the imaging device 110 can be a digital still camera, a camera phone, or the like, and the processing device 150 can be a computer, laptop, or the like. In the description that follows, the imaging device 110 is referred to as a camera, and the processing device 150 is referred to as a computer for illustrative purposes.

The camera 110 includes an imaging sensor 120 for capturing digital images. The imaging sensor 120 can be any of the various types of imaging sensors known and used in the art, such as a charged coupled device. The camera 110 also has processor and memory hardware 130 and an interface 140 for communicating data to the computer 150. In turn, the computer 150 has an interface 160, processor and memory hardware 170, operating system and application software 180, and an output device 190.

In use, the imaging sensor 120 of the camera 110 captures a RAW image 122. As discussed previously, the imaging sensor 120 has a color-filtered array that can be arranged in an RGB Bayer pattern. Therefore, the color value at each photo-site in the RAW image 122 represents either a red intensity value, a green intensity value, or a blue intensity value. Other camera manufactures may have other color filter arrays so that the RAW image 122 may have different, but generally equivalent information.

After capturing the RAW image, the processor/memory hardware 130 can output the RAW image 122 via the interface 140, which can be a Universal Serial Bus (USB) interface or other interface such as IEEE 1394 (a/k/a "Firewire") or an Ethernet or wireless Ethernet interface. The computer 150 can then receive the RAW image 122 with its corresponding interface 160. Preferably, the computer 150 stores the RAW image 122 as a master file to maintain an original copy of the RAW image 122 while processing is performed on a copy of the RAW image 122. In an alternative to importing the RAW image 122 from the camera 110, it can be imported from a network, a memory card, another computer, or an external storage media such as a flash memory, external hard disk drive, or CDROM.

Using various techniques, the specifics of which are not pertinent to this disclosure, the processor/memory hardware 170 and operating system/software 180 process the copy of the RAW image 122. Further details of an exemplary processing technique may be found in U.S. Pat. No. 7,773,127 entitled "System and Method for RAW Image Processing, which is hereby incorporated by reference. After processing the RAW image 122, the processor/memory hardware 170 and operating system/software 180 make the resulting image available to various types of software and applications on the computer 150. For example, the resulting pre-processed image may be made available to imaging applications, such as Apple's Preview, iPhoto, and Aperture software, where the image can be processed, viewed, manipulated, etc.

In the description above, the operating system/software 180 is used to process the RAW image 122. However, this processing could alternatively be provided by an application program without reliance on any operating system image processing capabilities. However, in either case, support for RAW images from new cameras require updates. These updates can preferably be performed as further described below.

Figure 2:
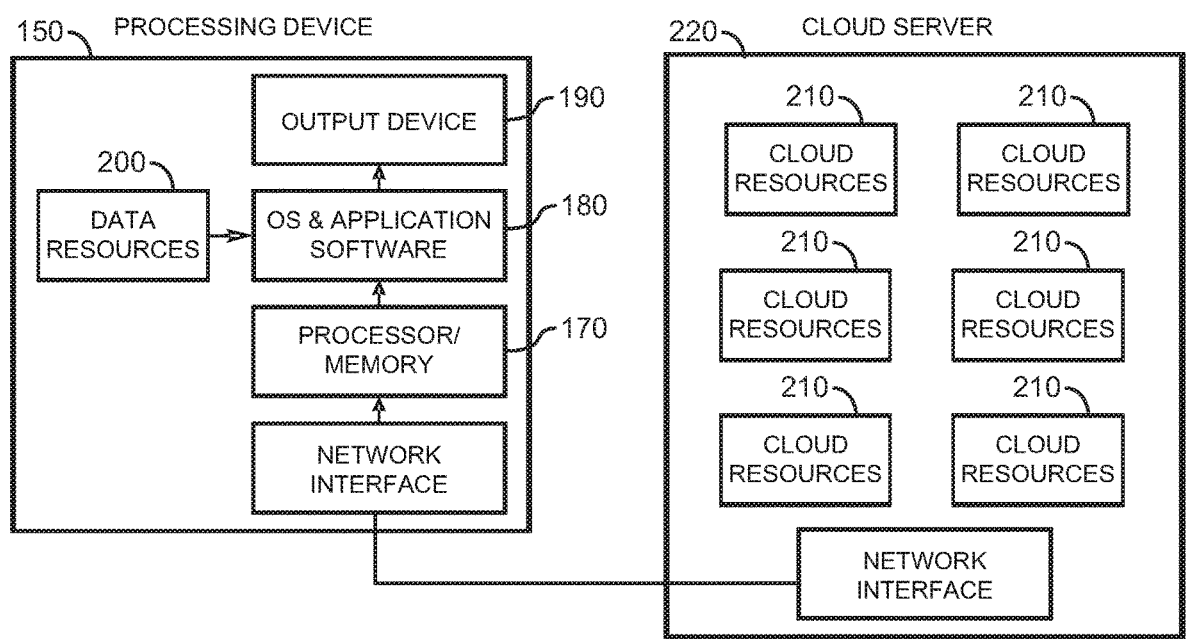
FIG. 2 illustrates an embodiment of a system for processing RAW images in which the camera support data resources have been factored out of the operating system and application software and are made available via a cloud server.

According to the update technique described herein, features like camera support are factored out of the binaries (whether system or application) into small, data only resources 200 (FIG. 2). Each resource can contain data that controls the behavior of a feature, such as support for a particular camera or a list of lens names. These local data resources 200 are cached copies of cloud resources 210, which can be provided by a server 220 connected to the processing device via the Internet, so that they may be accessed by any computer having internet access. In colloquial terms, these resources are stored in "The Cloud" and are collectively referred to herein as cloud resources. Whenever a computer or software package is delivered, it can, as a convenience, come preloaded with all cloud resources available at the time of shipping. It should be noted that the server includes a processor, memory, storage, an operating system, application software, etc., which are not shown for clarity.

Figure 3:
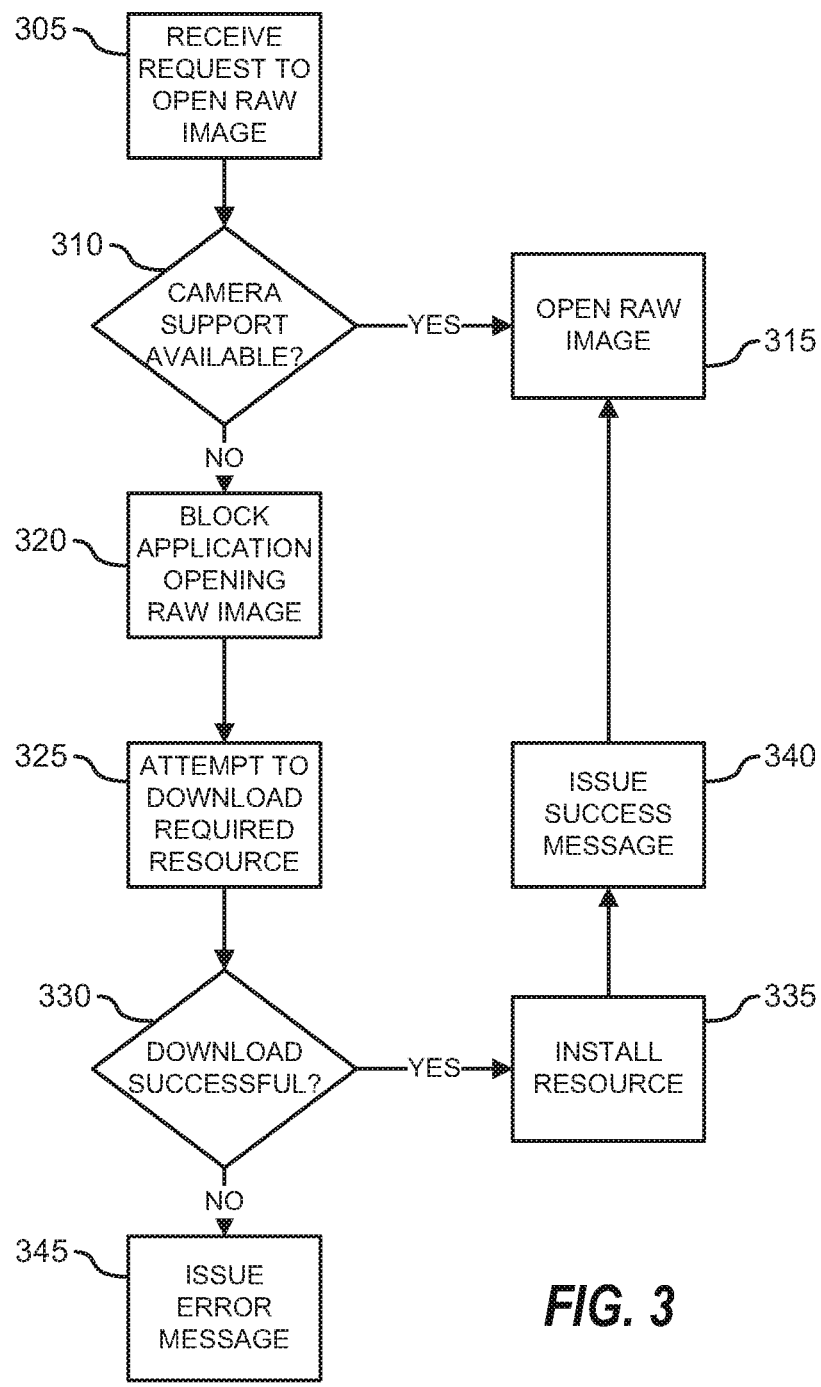
FIG. 3 illustrates a process for obtaining data resources from the cloud for opening RAW images.

Whenever an application running on the processing device attempts to open a RAW image, a process as illustrated in FIG. 3 occurs. The attempt to open a RAW image can be in the form of viewing the image, its thumbnail, or by requesting metadata from the image. When the request occurs a routine for opening the image is called. This routine can either be part of the application itself, or it can be an operating system service. For purposes of the following description, "the service" will be used to refer to such routine. In the case of OS X, RawCamera is called.

Upon receiving the request (305), the service determines whether support for the camera (i.e., RAW image format) is available (310) in a local cache of resources. If so, the RAW image is opened (315) using the resource. If the image originates from a camera that is not supported by the installed version of whatever software supports the camera, the service (e.g., RawCamera) can temporarily block the user-facing client application 320 while it attempts to download the required resource (330). If the download is successful (330), then the service installs the resource (335), issues a success message (340), and opens the RAW image (315) using the parameters in the downloaded file. If the download is not successful (330), then an error message (345) can be issued. In either case, this can happen transparently or semi-transparently to the user, depending on whether the application displays either the error or success messages. In the case where camera support is provided by an operating system service, the process can also be transparent to the application depending upon the underlying messaging.

Under most conditions, this process can happen so quickly that the user will not notice the brief delay. However, in some cases it may not be possible to install the new plug-in within a few seconds. This can be due to network issues, unavailability of an appropriate cloud resource, or other causes. As noted above, in the case of such a failure, the service can return an error code (345) indicating why it failed to install support for the camera. Alternatively, in the case of a successful install of the appropriate cloud resource, a success code can be provided (340). Savvy applications can use the error or success code to provide users with enhanced information. This can take the form of a message to the user that the required camera support was not installed because Internet access was unavailable or be a message indicating that support for a new camera was installed, or that it failed because access to the Internet was unavailable. In some cases (successful installations of a required cloud resource, for example), it may be desirable to not provide any messaging to the user.

To reduce undue communications or attempts to communicate with "The Cloud," the service may limit unsuccessful attempts to download a certain camera plug-in within a certain time period. For example, it may limit to one or two unsuccessful attempts per day. This may be useful, for example, when a popular new camera is released, as it will prevent large numbers of users from continually requesting an updated camera profile cloud resource that has not yet been made available. Additionally, the service can also detect unusual usage patterns and adapt or limit network access accordingly. For example, if a user is attempting to open images from hundreds of different unsupported cameras within a short period of time, the service can stop trying to download camera support immediately and instead try to download the camera plug-ins later in a single batch transaction. Other limits can also be imposed.

In addition to providing support for new cameras, the processes and cloud resources described herein can also be used to update existing resources that are already installed on the local machine. For example, such updates could be used to update already supported cameras, provide a bug fix, update lists of lens names, etc. Updates of cloud resources that are already supported can be handled differently than installation of new cloud resources. Rather than an on-demand install, as described above, updates to existing cloud resources can be installed at regular intervals. These intervals can be either time-based, such as daily, weekly or some other interval. The intervals could also be triggered by certain events, for example, rebooting the system or starting an application using the service. Additionally, it may be preferable to not install updates for cloud resources that are not being used. This could include resources that were used in the past, but are no longer used, such as when a user gets a new camera. It could also include resources that were installed by preloading upon shipment of the computer system and or installed software, but have never been used by a particular user. Alternatively, in some cases, it may be desirable to install updates—or at least check for updates—on demand as the resources are used.

The cloud resources themselves can take a variety of forms. In one embodiment, the cloud resources can be small pieces of data, usually few kilobytes in size, that control the behavior of certain features. Although cloud resources "live" in "The Cloud," they can also be copied to the local machine on demand, where they act as a cache of the cloud resource. This allows the user to employ the resource without having a live network connection and also expedites use of the resources as a fresh download is not required each time the resource is accessed.

A cloud resource is uniquely identified by a name. Besides the name, a cloud resource can also have a type, version, and a minimum local host version, the latter being the minimum required version of the service employing the resource, e.g., Apple's RawCamera framework. Exemplary cloud resources can include camera plug-in resources and lens name resources.

A camera plug-in resource can provide support for opening RAW image files from a specific kind of camera. Camera plug-ins can be named using a unique camera identifier ("UCI"). The UCI uniquely identifies a certain camera, including its file type and model-specific traits. The UCI can be considered a fingerprint for a particular camera model and is derived primarily using information found in the image files generated by the camera.

One example of a UCI can use a dot notation, similar to the reverse domain name format currently used for preference files in Mac OS X. Such notations can take the following format: <type>.<maker>.<model>.[trait-1].[trait-2].[trait-n]. For example, a Cannon 40D camera would have a UCI denoted: cr2.canon.2147484048.sraw. In this particular case, the number "2147484048" represents the unique Canon camera model ID, and the trait "sraw" indicates that this UCI is used to match raw image files from Canon 40D, shot using the sRaw feature.

Figure 4:
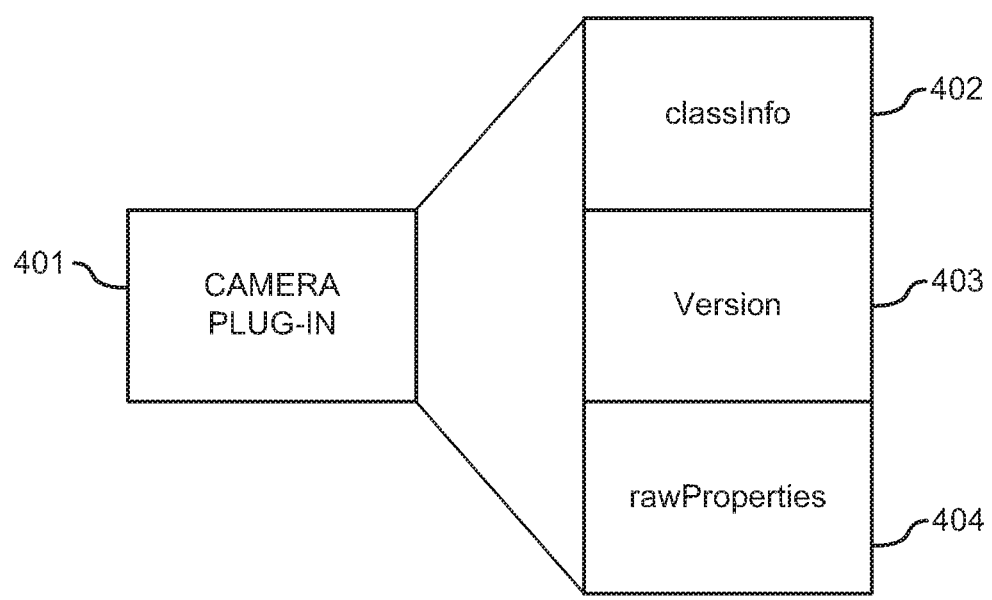

The camera plug-in can be made up of one or more files, combined into a single archive file, as illustrated in FIG. 4. The one or more files making up the camera plug-in 401 can include classInfo file 402, version file 403, and rawProperties file 404. The classInfo file 402 can contain information about the name of the internal class used to implement support for this camera, as well as information about what processing pipeline versions this camera plug-in supports. For example, a class may be used to group a number of cameras from a particular manufacturer or even a number of cameras from different manufacturers that include common features. The version file 403 can contain the version number of the camera plug-in file itself, as well as the earliest version of the service that the camera plug-in is compatible with. The rawProperties file 404 can contain properties used by the processing pipeline when processing images from this camera, i.e., all of the camera-specific information needed to process RAW data files from the camera, which can include various settings that would be implemented in code according to the teachings of the prior art.

The format described above is merely exemplary, and other arrangements or formats could be used. Particularly, the various files making up the plug-in could be combined or further subdivided. Additional files could also be added, containing camera specific data, like look up tables used by vendor's to create specific "looks" for their cameras. (Often vendors have particular settings that they recommend to obtain a desired performance from their camera, known as "looks." However certain users may desire a different look, which is basically a different way of rendering the color data.)

Another resource that can be used is a lens name resource. Lens name resources are used to convert lens identifiers, as used by a camera manufacturer, to user understandable lens names. This data is useful to the user for a variety of reasons.

Lenses are commonly identified by a lens ID that is valid within the realm of a camera manufacturers cameras. This lens ID is included in the metadata of an image taken with a camera using that lens. Third party lens manufacturers often reuse lens ID's that are already being used by the camera manufacturer, although the third party lens may reuse the lens ID having different characteristics (focal length, focal ratio or aperture, etc.) than the camera manufacturer's lens having the same ID. Thus, a lens ID does not uniquely identify a lens, which can lead to ambiguities when trying to identify a specific lens with which the image was taken.

To circumvent this ambiguity, the service can attempt to disambiguate lens ID's using additional metadata like focal length and aperture to determine the correct name of the lens used. For this to work successfully, a list of lens ID's and corresponding lens names is required, one for each lens manufacturer. This list can be embodied as a lens resource using any of a variety of suitable data structures. The lens name resources can be given names using the camera or lens manufacturer name, and can contain a list correlating lens IDs to the various parameters used to identify the lenses.

Returning to FIG. 2, to implement the system described herein, it may be desirable to split the RAW image processing service into two parts. One part will contain the binary code required for the image processing, as is done in prior art embodiments, e.g., operating system and/or application software 180. A second, new part, can contain the data resources 200 (e.g., camera plug-in resources and lens name resources) that are downloaded and installed on demand. These data resources 200 contain the parameters needed by the code in the operating system and/or application software 180.

Thus, whenever the service detects an image from an unsupported camera, it can query a software update service whether a camera update is available that provides support for that camera as described above with respect to FIG. 3. If the raw image processing service is part of an application, the software update service may be part of the same application or may be a separate operating system service. Alternatively, if the raw image processing service is an operating system service, it is likely that the software update service will also be a system service. In the case of Mac OS X, due to the way the software update service works, it can answer that question (i.e., whether a camera support update is available) without contacting a software update server. This is because Software Update in Mac OS X periodically queries the software update server to know what updates for available and caches this information for use at a later time, even if the available updates are not downloaded.

Whether an update is available or not, the service will fail to open the image. However, if an update is available, the service can do a silent install of the cloud resource, using the software update service. Before installation begins, the RAW image processing service, the software update service, or some other service can issue a global notification telling interested parties (i.e., various applications) that new camera support is about to be installed. Once the installation finishes, a second global notification can issued that tells interested parties that new camera support has been installed (or that the installation has failed, as appropriate). Savvy applications can use these notifications to tell users that camera support is being updated and to refresh any previously unsupported images. Alternatively, an application may choose not to deliver this information to the user.

It should also be noted that the system described herein in which the binary code for RAW image processing is separated from the data parameters relating to specific cameras can be used without on-demand installation. For example, a user may desire to install all available updates at one time. In such a case, an application or an operating system preference control panel can provide the user with an interface for accessing the required cloud resources via a network connection. Alternatively, the "cloud resources" may be distributed in other ways, including, for example, including the required support information in the digital camera itself. In such a case, the camera could make the data available to any computer with which it interfaces.

As noted previously, a processing device (e.g., computer, imaging device, camera, etc.) having an operating system can perform RAW image processing methods, services, and techniques disclosed herein. In addition, a program storage device, readable by a programmable processing device, can have instructions stored on the program storage device for causing the programmable processing device to perform the automated RAW image processing methods and techniques disclosed herein.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for processing a RAW image file captured by a digital camera, the system comprising:
 a network interface; and
 a processor and a memory coupled to the network interface, wherein the memory is configured to store, and the processor is configured to execute, machine readable instructions to:
  obtain, via the network interface, a plurality of non-executable, data-only resources, wherein each of the plurality of non-executable, data-only resources includes information that provides RAW image support for a given digital camera model;
  store, in the memory, the obtained plurality of non-executable, data-only resources as a local cache of cloud resources;
  receive a RAW image file captured by a particular digital camera;
  detect, after receipt of the RAW image file, whether an image processing service can process a particular format of the RAW image file;
  determine, in response to detecting that the image processing service cannot process the particular format of the RAW image file, whether a non-executable, data-only resource corresponding to the particular digital camera is included as one of the plurality of non-executable, data-only resources in the local cache, wherein the non-executable, data-only resource is generated at a time that is different from a capture time of the RAW image file, and wherein the non-executable, data-only resource includes camera-specific information that is specific to a model of the particular digital camera and that is needed to process RAW image files of the particular format from the particular digital camera;
  obtain, in response to determining that the non-executable, data-only resource corresponding to the particular digital camera is included in the local cache, one or more parameters from the non-executable, data-only resource, the one or more parameters being associated with processing the RAW image file captured by the particular digital camera;

update the image processing service based, at least in part, on the one or more parameters; and process the RAW image file having the particular format using the updated image processing service.

2. The system of claim 1, wherein the memory is further configured to store, and the processor is further configured to execute, machine readable instructions to attempt, in response to determining that the non-executable, data-only resource corresponding to the particular digital camera is not included in the local cache, to download the non-executable, data-only resource from a cloud server storing the cloud resources.

3. The system of claim 2, wherein the memory is further configured to store, and the processor is further configured to execute, machine readable instructions to connect, on demand or on a periodic basis, to the cloud server storing the cloud resources to update the plurality of non-executable, data-only resources stored in the memory as the local cache.

4. The system of claim 1, wherein the memory is further configured to store, and the processor is further configured to execute, machine readable instructions to update an existing non-executable, data-only resource that is already stored in the memory as the local cache of cloud resources.

5. The system of claim 4, wherein the machine readable instructions to update the existing non-executable, data-only resource further comprise machine readable instructions to at least one of:

update a support for an already supported digital camera model;

provide a bug fix; and update a list of lens names.

6. The system of claim 1, wherein each of the plurality of non-executable, data-only resources includes at least one of a classInfo file, a version file, and a rawProperties file.

7. The system of claim 6, wherein:

the classInfo file includes information of an internal class used to implement support for a corresponding digital camera model, and information of supported versions of a processing pipeline;

the version file includes information of a version of the non-executable, data-only resource, and information of an earliest version the image processing service the non-executable, data-only resource is compatible with; and the rawProperties file includes properties used by the processing pipeline when processing RAW images from the corresponding digital camera model.

8. A non-transitory program storage device, readable by a processor and comprising instructions stored thereon, for processing a RAW image file, to cause the processor to:

obtain, via a network interface, a plurality of non-executable, data-only resources, wherein each of the plurality of non-executable, data-only resources includes information that provides RAW image support for a given digital camera model;

store, in a memory, the obtained plurality of non-executable, data-only resources as a local cache of cloud resources;

receive a RAW image file captured by a particular digital camera;

detect, after receipt of the RAW image file, whether an image processing service can process a particular format of the RAW image file;

determine, in response to detecting that the image processing service cannot process the particular format of the RAW image file, whether a non-executable, data-only resource corresponding to the particular digital camera is included as one of the plurality of non-executable, data-only resources in the local cache, wherein the non-executable, data-only resource is generated at a time that is different from a capture time of the RAW image file, and wherein the non-executable, data-only resource includes camera-specific information that is specific to a model of the particular digital camera and that is needed to process RAW image files of the particular format from the particular digital camera;

obtain, in response to determining that the non-executable, data-only resource corresponding to the particular digital camera is included in the local cache, one or more parameters from the non-executable, data-only resource, the one or more parameters being associated with processing the RAW image file captured by the particular digital camera;

update the image processing service based, at least in part, on the one or more parameters; and process the RAW image file having the particular format using the updated image processing service.

9. The non-transitory program storage device of claim 8, further comprising instructions to cause the processor to attempt, in response to determining that the non-executable, data-only resource corresponding to the particular digital camera is not included in the local cache, to download the non-executable, data-only resource from a cloud server storing the cloud resources.

10. The non-transitory program storage device of claim 9, further comprising instructions to cause the processor to connect, on demand or on a periodic basis, to the cloud server storing the cloud resources to update the plurality of non-executable, data-only resources stored in the memory as the local cache.

11. The non-transitory program storage device of claim 8, further comprising instructions to cause the processor to update an existing non-executable, data-only resource that is already stored in the memory as the local cache of cloud resources.

12. The non-transitory program storage device of claim 11, wherein the instructions to cause the processor to update the existing non-executable, data-only resource further comprise instructions to cause the processor to at least one of:

update a support for an already supported digital camera model;

provide a bug fix; and update a list of lens names.

13. The non-transitory program storage device of claim 8, wherein each of the plurality of non-executable, data-only resources includes at least one of a classInfo file, a version file, and a rawProperties file.

14. The non-transitory program storage device of claim 13, wherein:

the classInfo file includes information of an internal class used to implement support for a corresponding digital camera model, and information of supported versions of a processing pipeline;

the version file includes information of a version of the non-executable, data-only resource, and information of an earliest version the image processing service the non-executable, data-only resource is compatible with; and the rawProperties file includes properties used by the processing pipeline when processing RAW images from the corresponding digital camera model.

15. A method of processing an image file by image processing software executed by a computer, the method comprising:

obtaining, via a network interface, a plurality of non-executable, data-only resources, wherein each of the plurality of non-executable, data-only resources includes information that provides RAW image support for a given digital camera model;

storing, in a memory, the obtained plurality of non-executable, data-only resources as a local cache of cloud resources;

receiving a RAW image file captured by a particular digital camera;

detecting, after receipt of the RAW image file, whether an image processing software can process a particular format of the RAW image file;

determining, in response to detecting that the image processing software cannot process the particular format of the RAW image file, whether a non-executable, data-only resource corresponding to the particular digital camera is included as one of the plurality of non-executable, data-only resources in the local cache, wherein the non-executable, data-only resource is generated at a time that is different from a capture time of the RAW image file, and wherein the non-executable, data-only resource includes camera-specific information that is specific to a model of the particular digital camera and that is needed to process RAW image files of the particular format from the particular digital camera;

obtaining, in response to determining that the non-executable, data-only resource corresponding to the particular digital camera is included in the local cache, one or more parameters from the non-executable, data-only resource, the one or more parameters being associated with processing the RAW image file captured by the particular digital camera;

updating the image processing software based, at least in part, on the one or more parameters; and processing the RAW image file having the particular format using the updated image processing software.

16. The method of claim 15, further comprising attempting, in response to determining that the non-executable, data-only resource corresponding to the particular digital camera is not included in the local cache, to download the non-executable, data-only resource from a cloud server storing the cloud resources.

17. The method of claim 16, further comprising connecting, on demand or on a periodic basis, to the cloud server storing the cloud resources to update the plurality of non-executable, data-only resources stored in the memory as the local cache.

18. The method of claim 15, further comprising updating an existing non-executable, data-only resource that is already stored in the memory as the local cache of cloud resources.

19. The method of claim 18, wherein updating the existing non-executable, data-only resource further comprises to at least one of:

updating a support for an already supported digital camera model;

providing a bug fix; and updating a list of lens names.

20. The method of claim 15, wherein each of the plurality of non-executable, data-only resources includes at least one of a classInfo file, a version file, and a rawProperties file, and wherein:

the classInfo file includes information of an internal class used to implement support for a corresponding digital camera model, and information of supported versions of a processing pipeline;

the version file includes information of a version of the non-executable, data-only resource, and information of an earliest version the image processing software the non-executable, data-only resource is compatible with; and the rawProperties file includes properties used by the processing pipeline when processing RAW images from the corresponding digital camera model.

* * * * *